July 12, 1949. R. A. SMITH 2,475,921
GLARE REDUCTION FILTER COMPRISING LIGHT POLARIZING AREA
MERGING GRADUALLY WITH TRANSPARENT NONPOLARIZING AREA
Filed June 26, 1940
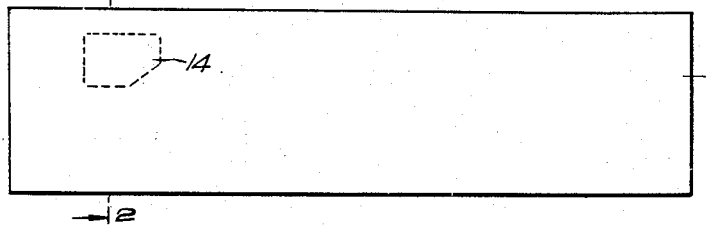
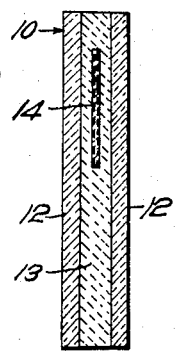
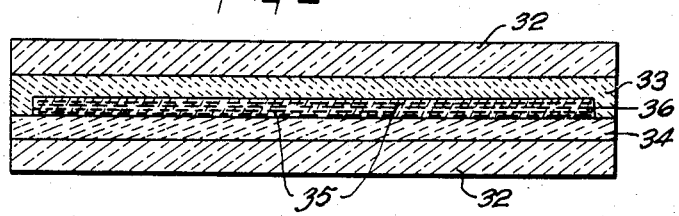
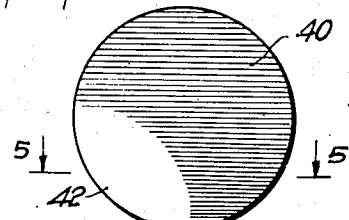
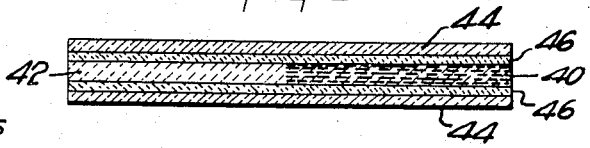
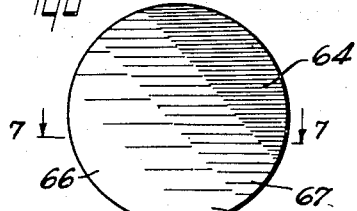
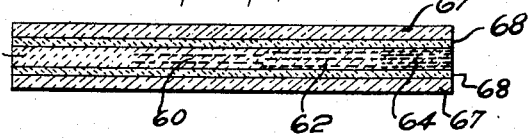
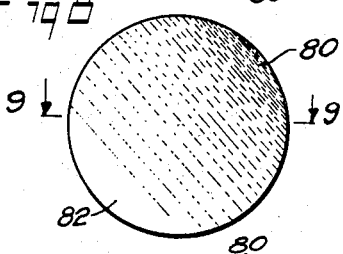
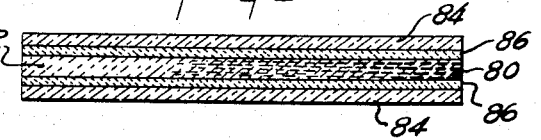
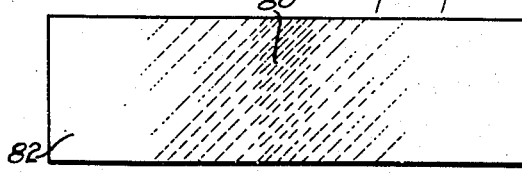
INVENTOR.
Robert A. Smith
Donald L. Brown Patented July 12, 1949

2,475,921

UNITED STATES PATENT OFFICE 2,475,921

GLARE REDUCTION FILTER COMPRISING LIGHT POLARIZING AREA MERGING GRADUALLY WITH TRANSPARENT NON-POLARIZING AREA

Robert A. Smith, Mahwah, N. J., assignor to Polaroid Corporation, Dover, Del., a corporation of Delaware Application June 26, 1940, Serial No. 342,467

4 Claims. (Cl. 88—65)

This invention relates to glare reduction filters comprising light-polarizing areas which merge gradually with transparent non-polarizing areas.

An object of the invention is to provide a new and improved windshield or viewing visor for use in optical systems employing polarized light for the reduction of automotive vehicle headlight glare, said visor comprising an area which substantially completely polarizes transmitted light and which merges gradually and with decreasing polarizing effect into a second area, positioned preferably adjacent one edge of said visor, which is transparent and non-polarizing.

A further object of the invention is to provide a new and improved light-polarizing headlight shield for cooperation with the improved windshield or visor of the invention, both said headlight shield and said windshield or visor comprising areas which transmit light without appreciable polarization, and areas which transmit light with substantially complete polarization, and in some cases areas which transmit light with less than complete polarization.

Another object of the invention is to provide a light-polarizing means of substantially uniform thickness which merges gradually with a non-polarizing means of susbtantially the same thickness, the degree of polarization varying throughout the merging area.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the invention, reference should be had to the accompanying drawing, wherein:

Figure 1 is a view in front elevation of a windshield viewing visor embodying one form of the invention;

Fig. 2 is a cross-sectional view along the line 2—2 of the device shown in Fig. 1, somewhat enlarged;

Fig. 3 is a cross-sectional view of a modification of the device shown in Fig. 1;

Fig. 4 is a view in elevation of a headlight screen or similar device embodying one form of the invention;

Fig. 5 is a cross-sectional view of Fig. 4 along the lines 5—5;

Fig. 6 is a view in elevation of a modification of the structure shown in Fig. 4;

Fig. 7 is a cross-sectional view of the device shown in Fig. 6 along the line 7—7;

Fig. 8 is a view in elevation of a still further modification of the devices shown in Figs. 4 and 6;

Fig. 9 is cross-sectional view of the device shown in Fig. 8 along the lines 9—9; and Fig. 10 is a view in elevation of a viewing screen adapted for use as a viewing visor or in a windshield as in Fig. 1, and which may be used, for example, as a complementary viewing screen in cooperation with the devices shown in Figs. 4, 6 and 8.

Heretofore, in connection with the use of light-polarizing material, and particulary light-polarizing material of the type comprising a film-like suspending medium, such for example as a suspending medium of cellulose acetate having embedded and dispersed therein a multiplicity of light-polarizing particles, and more particularly needle-shaped particles of herapathite or like material with their polarizing axes oriented to substantial parallelism, certain difficulties have arisen in connection with laminations of such material to glass. It has been found, for example, that unless the lamination is edge-sealed, it frequently happens that the polarizing properties of the light-polarizing film are impaired, particularly where the lamination is subjected to a moist, warm climate.

So also, where it is desirable to provide a lamination, a portion only of which is light-polarizing, as for example in the windshield visors or viewing screens hereinafter described, it has been found, where certain adhesives are used which do not flow freely and which are preferred in the manufacture of the lamination, that the added thickness of the polarizing film may greatly increase the difficulties of forming laminations, particularly with automatic lamination machines. The polarizing film imparts added thickness to a lamination, making uniform distribution of pressure difficult and giving rise to frequent breakage.

Moreover, it has been found, with respect to most adhesives for glass, that they do not adhere well to the polarizing strip, and hence it is desirable in many cases, and even though the polarizing strip or film may comprise substantially all of the lamination area, to provide an end strip of adhesive so that a satisfactory bond may be secured between the two glass sheets. Such a device is shown, for example, in Fig. 3.

For any or all of these reasons it has been found desirable to develop a lamination comprising a layer of polarizing material completely surrounded by an adhesive layer and laminated thereby to two overlying sheets of glass. Such a device is shown in Figs. 1 and 2, wherein 10 represents generally a windshield or similar device comprising a pair of glass sheets 12 laminated together by an adhesive layer 13 having embedded therein a light-polarizing foil or film 14 of the character described. Specifically the adhesive employed may be a vinyl resin, such for example as a plasticized vinyl acetate or an incomplete polymerized polyvinyl acetal, which may have excellent adhesion for the glass plate 12 and fair adhesion for the polarizing film 14, or the adhesive may comprise a material such as Lucite or Canada balsam, or any other suitable adhesive which may, for example, be cast or formed about the polarizing layer or film 14 or into which the polarizing film may be pressed when the adhesive is in softened condition. The adhesive layer containing the polarizing layer 14 may then be placed between the sheets of glass 12 and a satisfactory lamination secured. The thickness of the adhesive layer throughout the areas wherein it is clear and throughout the areas wherein it contains the light-polarizing layer or film will be substantially uniform, and the lamination secured, as shown in Fig. 2, will be a substantially flat lamination.

In Fig. 3 a slightly different lamination is shown. Here the glass sheets 32 are laminated by means of the adhesive layers 33, 34, to a light-polarizing layer or film 35 of the character described. One of the adhesive layers, for example the layer 33, may be provided, around its circumference, with supplemental adhesive in the shape of an extension 36 having substantially the thickness of the polarizing layer 35. With such a structure direct adhesion can be secured between the two adhesive layers around the entire circumference of the polarizing layer, and a unitary lamination may be obtained comprising the two glass sheets 32 and the adhesive layer having in its center a polarizing film 35, which may cover substantially the entire area of the lamination, or any predetermined portion thereof.

In Figs. 4 and 5 a different form of device is shown. Fig. 4, for example, may represent either a headlight lens or a viewing screen in which the area 40 is a light-polarizing area and in which the area 42 is a non-polarizing area, but an extension of and a part of the film or foil comprising the area 40. A better understanding of the invention can perhaps be obtained from Fig. 5, where the polarizing area 40 is shown heavily shaded and the non-polarizing area 42 lightly shaded. It will be seen that these areas are part of a central film or foil element of a lamination comprising the glass plates 44, the adhesive layers 46, and the intermediate partially polarizing and partially non-polarizing film.

This intermediate layer or film may be formed in a number of ways. A method of forming this layer is to cut out from a polarizing film a segmental or scalloped-shaped portion 42 and replace it either with a similarly shaped piece of non-polarizing material or by means of material of one of the adhesive layers 46, as in Fig. 3. The important detail in this step is to make sure that this layer is ultimately of uniform thickness throughout.

As is shown in Fig. 4, the polarizing and non-polarizing portions 40 and 42 may be of any desired shape, that shown in Fig. 4 being a preferred shape for the headlights of an automobile as seen from the front. A lens having such a configuration will polarize all that portion of the light which is normally directed ahead down the road, and hence which is normally most likely to cause glare to a driver approaching in the opposite direction. Since this light is polarized, it can be blocked with a suitable viewing screen such as those shown in Figs. 1, 2, 3 and 10. At the same time, such a lens will transmit in unpolarized condition that portion of the light which is normally directed obliquely downward to the driver's right and illuminates the edge of the roadway farthest from an approaching driver, with no loss in intensity. It will be apparent that under normal conditions both headlights should be equipped with similar lenses positioned in the same way.

In Figs. 6 and 7 there is shown a further modification of the invention. The lens shown therein is similar to that shown in Figs. 4 and 5 but differs primarily in that the intermediate layer containing the polarizing portions is itself preferably laminated in form. This layer is composed of a non-polarizing portion 66 adjacent the periphery of the lens and a plurality of strips 60, 62 and 64 which are adapted to polarize transmitted light with progressively increasing effect. Thus strip 60 may be adapted to transmit 70% of the undesired component, strip 62 may be adapted to transmit only 35% of the undesired component, while strip 64 is preferably adapted to polarize transmitted light completely. Fig. 7 shows an assembled lamination, the intermediate layer being secured by means of adhesive layers 68 between a pair of glass sheets 67 to form the finished lens.

The layer containing the polarizing portions in Figs. 6 and 7 may be formed in a number of ways. For example, it may be composed of a plurality of overlying thin sheets of polarizing material of different widths, having non-polarizing layers 66 in association therewith, the polarizing portions varying in area depending upon the amount of polarizing effect desired. The polarizing properties of each such sheet may be such that substantially complete polarization is secured by causing a beam of light to traverse a plurality of sheets. Thus it will be seen from Fig. 7 that this layer may comprise a superimposed, bonded multiplicity of such sheets. Some of such sheets are polarizing over a large area, and their polarizing portion will produce the polarizing effect in strip 60 in Fig. 6. Others of such sheets are polarizing over about half their area, and their polarizing portion is added to that of the first sheets to produce the polarizing effect in strip 62 in Fig. 6. The remaining sheets are polarizing over only a small area, as is indicated in Fig. 7, but their polarizing portion is added to those of the other sheets to produce the completely polarizing strip 64. It will be seen that an advantage of this construction is that it is relatively simple to insure the uniform thickness of the intermediate layer and hence the satisfactory lamination of the final product.

There are a number of other ways of forming the intermediate layer of the lens shown in Figs. 6 and 7. For example, it may be formed by combining separate strips of polarizing and non-polarizing material of varying sizes in the manner described above. It may be formed by taking a polarizing sheet of the desired initial thickness and shaving it to a substantially wedge-shaped form. If this latter method is used, the wedge shape of the intermediate layer should be compensated for by additional adhesive as described above in connection with Fig. 3. In operation the action of the lens shown in Figs. 6 and 7 will be substantially the same as that described in connection with Figs. 4 and 5.

In Figs. 8 and 9 there is shown a still further modification of the invention. In the headlight lens shown in these figures the polarizing effect increases gradually from the non-polarizing portion 82 to the portion of complete or maximum polarization 80. In this lens the intermediate layer is preferably of transparent plastic material containing dispersed, oriented polarizing particles. The graduated polarizing effect is attained by controlling the concentration of said particles throughout the plastic carrier. Thus as the polarizing film is formed, one part, such as the area 80, will have a high concentration of said particles or crystals, but the concentration will be progressively lower across the film so that the area 82 will have an exceedingly low concentration or none at all. Another advantage of this method is that the layer will already be of uniform thickness and need only be joined to glass sheets 84 by adhesive layers 86 to form the finished lamination. In operation such a lens will act on the transmitted light in substantially the same manner as the other lenses described above.

It will be obvious that the concentration of the polarizing crystals may be controlled to any desired degree throughout the film. That is, the highly concentrated area 80 may be along either or both edges of the film, in the center, or adjacent either edge but separated therefrom by an area of lower crystalline concentration. One such optional form is shown in Fig. 10, which is designed to represent a windshield or drop flap through which the driver of an automobile may look against any of the headlights equipped with lenses such as those shown in Figs. 4, 6 and 8. In Fig. 10 the most highly concentrated area of polarizing particles is shown at 80, substantially in the center of the screen, and the polarizing action becomes gradually less and decreases to a non-polarizing effect in the outer portions 82 of the screen, where no polarizing crystals are employed. With such a visor or viewing screen the driver of a car can, by moving his head, obtain any desired position with respect to the polarizing properties of the screen. Thus he may look through a portion of the screen which is totally free of polarizing crystals, through a portion 80 which gives him maximum cut-off, or through an intermediate portion which gives intermediate cut-off of the beam of an approaching vehicle.

A screen such as that shown in Fig. 10 may may be used in a number of ways and forms. It may be used independently of the windshield as a drop flap, in which case it may consist of a sheet of polarizing material which may or may not be laminated to a sheet or sheets of glass. It may be used very advantageously in a windshield in the manner shown in Figs. 1, 2 and 3. In such a construction a screen such as that in Fig. 10 would take the place of the screens 14 and 35 in Figs. 1, 2 and 3, and the polarizing portions of the screen would merge with decreasing polarizing effect into the surrounding non-polarizing areas of the screen itself and of the surrounding adhesive material. When such a viewing screen is used in a vehicle lighting system in combination with headlight lenses such as those shown in Figs. 4–9, it should of course be so positioned that its polarizing axis is substantially at right angles to the polarizing axes of the headlight screen on a similarly equipped approaching vehicle, in ways known to the art.

Since certain changes may be made in the above articles and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A laminated lens comprising two sheets of glass, a layer of transparent material and adhesive means bonding said transparent material between said glass sheets, said transparent layer including a non-polarizing area adjacent its periphery, the remainder thereof containing light-polarizing particles in progressively greater concentration away from said area, all of said particles being oriented to substantial parallelism, whereby said layer is made progressively more polarizing and more light-absorbing in that portion farthest from said non-polarizing portion, said transparent layer being of uniform thickness throughout.

2. A light polarizer comprising a sheet of light-transmitting organic plastic material containing dichroic light-polarizing material, all of said light-polarizing material being oriented to substantial parallelism, different predetermined portions of said polarizer containing predeterminedly different quantities of said dichroic material per unit surface area of said polarizer, said portions absorbing incident light vibrating in a predetermined direction to differing degrees and providing an area of gradual merger between a portion containing the greatest quantity of said dichroic material per unit surface area and polarizing transmitted light substantially completely and a portion positioned adjacent one edge of said sheet and containing substantially no dichroic material and transmitting light without appreciable polarization thereof, said polarizer being of substantially uniform thickness throughout all of said portions thereof.

3. A light polarizer comprising a sheet of light-transmitting organic plastic material containing dichroic material oriented to substantial parallelism, the concentration of said dichroic material within said plastic differing predeterminedly in different portions thereof, that portion of said sheet containing the highest concentration of said dichroic material polarizing transmitted light substantially completely, that portion of said sheet containing a minimum concentration of said dichroic material being adjacent one edge of said sheet and transmitting incident light without appreciable polarization, the concentration of dichroic material in that portion of said sheet intermediate said first two portions being greater adjacent said first-mentioned portion than adjacent said second-mentioned portion.

4. A light polarizer comprising a transparent support, a plurality of light-polarizing sheets affixed to said support in superimposed relation, said sheets being of predeterminedly different size, each of said sheets comprising transparent organic plastic material having incorporated therein dichroic material oriented to substantial parallelism, said sheets being superimposed with the orientation directions of said dichroic material substantially parallel, each of said superimposed sheets being adapted partially to polarize transmitted light whereby the effectiveness of different portions of said polarizer to polarize transmitted light is a function of the number of said sheets comprising said portions, there being a minimum number of said superimposed sheets adjacent one edge of said light polarizer whereby that portion of said polarizer is least effective to polarize transmitted light, there being a maximum number of said sheets superimposed to form a second portion of said polarizer spaced from said first portion and adapted to polarize transmitted light most effectively, there being fewer superimposed sheets between said first- and second-mentioned portions than in said second-mentioned portion, and means for bonding said sheets together and to said support.

ROBERT A. SMITH.

REFERENCES CITED

The following references are of record in the file of this patent:

UNITED STATES PATENTS

| Number | Name | Date |
|---|---|---|
| 1,224,530 | Goetzke | May 1, 1917 |
| 1,257,541 | Sillcocks | Feb. 26, 1918 |
| 1,610,124 | Godley | Dec. 7, 1926 |
| 1,805,969 | Bostrom | May 19, 1931 |
| 1,872,553 | Ayers | Aug. 16, 1932 |
| 2,008,347 | Boots | July 16, 1935 |
| 2,017,705 | Sproxton | Oct. 15, 1935 |
| 2,031,045 | Land | Feb. 18, 1936 |
| 2,051,327 | Chalfant | Aug. 18, 1936 |
| 2,087,795 | Chubb | July 20, 1937 |
| 2,102,632 | Land | Dec. 21, 1937 |
| 2,168,220 | Land | Aug. 1, 1939 |
| 2,169,022 | Chubb | Aug. 8, 1939 |
| 2,185,018 | Sauer | Dec. 26, 1939 |
| 2,209,435 | Watkins | July 30, 1940 |
| 2,329,543 | Land | Sept. 14, 1943 |

FOREIGN PATENTS

| Number | Country | Date |
|---|---|---|
| 476,023 | Great Britain | Nov. 30, 1937 |
| 496,329 | Great Britain | Nov. 29, 1938 |
| 1,431,367 | Germany | Mar. 10, 1938 |
| 1,433,867 | Germany | Apr. 8, 1938 |